G. A. EBERHARDT.
SHOCK ABSORBER.
APPLICATION FILED JAN. 19, 1916.
1,234,312.
Patented July 24, 1917.
2 SHEETS—SHEET 1.
Fig. 1.
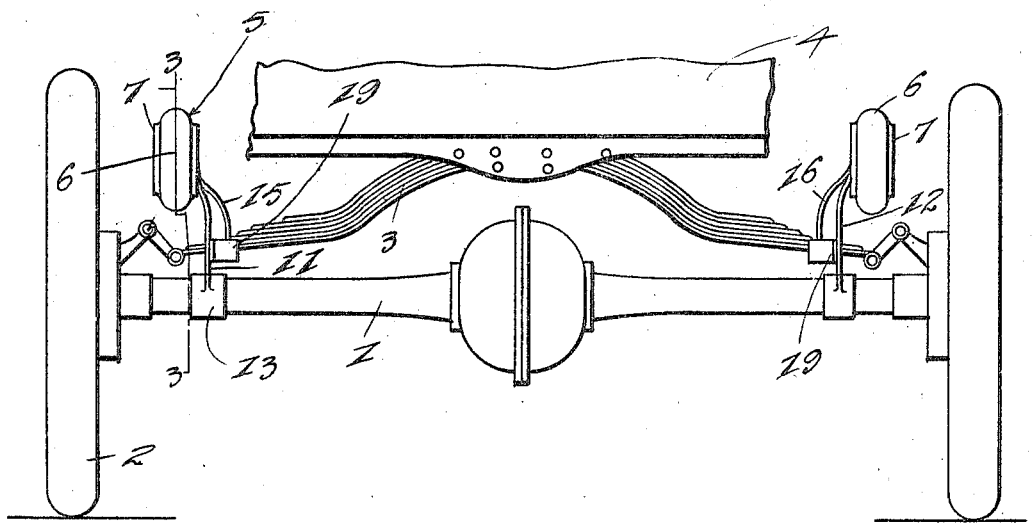
Fig. 2.
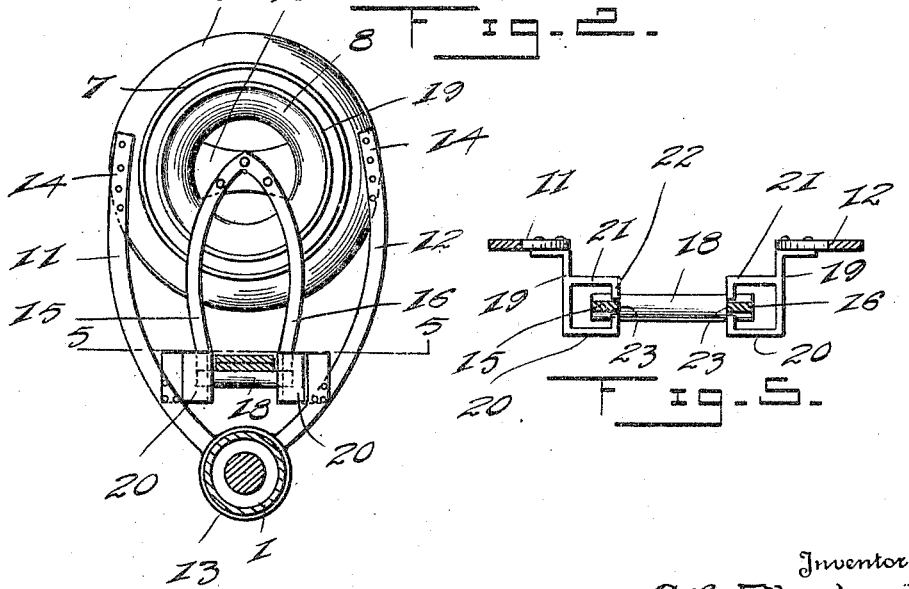
Fig. 3.
Witnesses
C R Beall
Inventor
G. A. Eberhardt
By ..........
Attorney

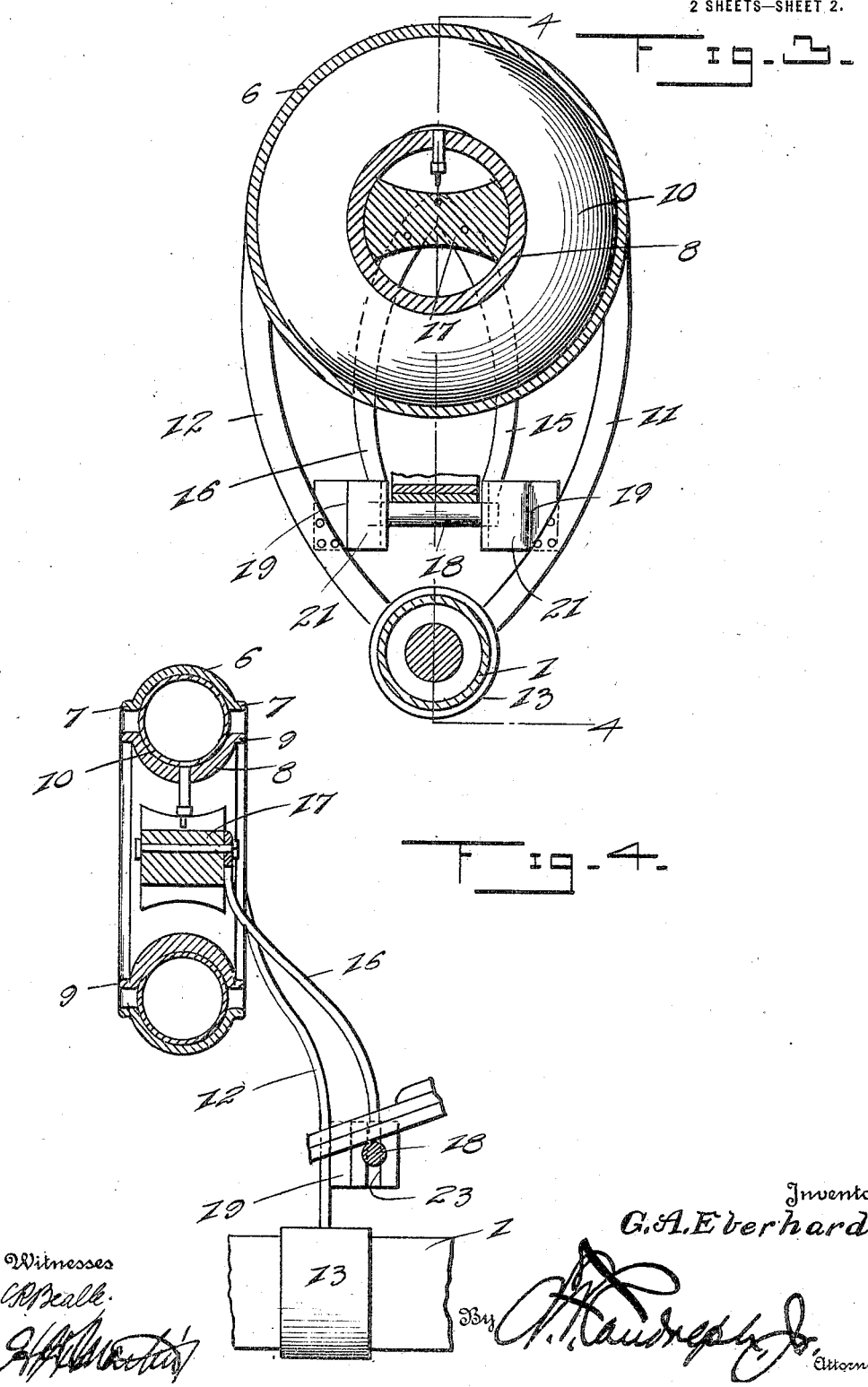

UNITED STATES PATENT OFFICE.

GUSTAV A. EBERHARDT, OF CHICAGO, ILLINOIS.

SHOCK-ABSORBER.

1,234,312.  Specification of Letters Patent.  Patented July 24, 1917.

Application filed January 19, 1916. Serial No. 73,009.

*To all whom it may concern:*

Be it known that I, GUSTAV A. EBERHARDT, a citizen of the United States, residing at Chicago, in the county of Cook and State of Illinois, have invented certain new and useful Improvements in Shock-Absorbers; and I do hereby declare the following to be a full, clear, and exact description of the invention, such as will enable others skilled in the art to which it appertains to make and use the same.

This invention relates to new and useful improvements in shock absorbers and is particularly adapted for use in connection for motor vehicles to be interposed between the spring structure and axle in order to alleviate the jars and shocks caused by road travel to the body of the vehicle.

Another object of the invention is to provide a shock absorber adapted for operation in a horizontal as well as in a vertical plane, thereby increasing the activity of the device and rendering the same more effective.

A further and more specific object is to provide a shock absorber having an outer and inner rim which are relatively movable and are separated from each other by a cushion of any preferred construction.

With these and other objects in view, the invention consists in the novel combination and arrangement of parts which will be fully set forth in the following specification and accompanying drawings, in which:

Figure 1 is a view of a portion of a vehicle showing this improved shock absorber attached thereto.

Fig. 2 is an inside view of the shock absorber showing the attaching bracket.

Fig. 3 is a vertical sectional view through the shock absorber on an enlarged scale and taken on the line 3—3 of Fig. 1.

Fig. 4 is a vertical sectional view on the line 4—4 of Fig. 3, and

Fig. 5 is a horizontal sectional view taken on line 5—5 of Fig. 2.

Referring to the drawings the numeral 1 designates the usual rear axle of a vehicle having mounted at its ends the wheels 2. The spring is designated by the numeral 3 and is attached as clearly shown in Fig. 1 to the body 4. It is to be understood that any desired type of spring suspension may be used in connection with this shock absorber without in any way departing from the spirit and scope of the invention, and the present illustration is merely shown to clearly set forth one of the methods.

The shock absorbers are designated generally by the numeral 5 and each of said absorbers comprises a transversely semi-circular annular outer rim 6 provided at its side edges with the outturned flanges 7 and the transversely semi-circular annular inner rim 8 is provided on its edges with the outturned flanges 9. It will be noted that the rims 6 and 8 are so formed and positioned with relation to each other as to form an annular chamber for the reception of a suitable cushioning element which will be more fully hereinafter described. It will further be noted that the rims are spaced from each other so that the flanges 7 and 9 will not contact thereby allowing a free movement of the rims with relation to each other.

The cushioning element hereinbefore referred to is designated by the numeral 10 and as illustrated in the drawing consists of a hollow tube provided with a suitable stem and valve through which the same may be inflated. As illustrated in Fig. 3, it will be noted that the stem and valve extend through the inner rim, but it is to be understood that the same may be positioned in any suitable place on the tube which will not interfere with the proper operation of the device.

Secured to the outer rim by a suitable rivet or in any other suitable manner is a bracket comprising a pair of arms 11 and 12 which are curved inwardly toward their lower terminals and connected to the sleeve 13 which is adapted to surround the axle of the vehicle. These arms are bifurcated at their upper ends to form the legs 14 which are secured to the outer rim 6 and it will thus be seen that the outer rim will be held rigidly with relation to the axle.

The supporting bracket for the inner rim comprises a pair of legs 15 and 16 which are curved inwardly toward each other at their upper terminals and riveted or otherwise secured to a block 17 having its ends concaved and curved to fit the curvature of the inner rim as clearly illustrated in the drawing. The lower ends of these arms are spaced from each other as clearly illustrated and are connected by the supporting web 18 on which the under leaf of the spring 3 rests.

Riveted or otherwise secured to the arms 11 and 12 are suitable guide brackets, each of which comprises an angle plate 19 having formed at its outer end, an inwardly extending flange 20 which coöperates with a similar flange 21 in forming a chamber in which the arms 15 and 16 are slidable. Suitable inwardly extending flanges 22 are formed at the inner extremities of the flanges 20 and 21 and these flanges 22 are spaced as at 23 to receive the lower terminals of the arms 15 and 16 and form guideways therefor, as clearly illustrated in Figs. 2 and 5 of the drawings. These brackets prevent lateral movement of the arms 15 and 16 with relation to the arms 11 and 12, while it will be noted that the said arms are free to move vertically and it will thus be seen that the side sway of the machine will not in any way render the device inoperative or liable to damage.

While in the foregoing there has been shown and described the preferred embodiment of this invention, it is to be understood that such changes may be made in the combination and arrangement of parts as will fall within the spirit and scope of the appended claims.

What is claimed is:—

1. A shock absorber comprising a substantially transversely semi-circular outer rim, a substantially transversely semi-circular inner rim of less diameter than the inside diameter of the outer rim, said rim when assembled forming a substantially circular cushion receiving chamber, a cushion in said chamber, a bracket secured to the outer rim, a sleeve on the bracket adapted to be connected to the axle of a vehicle, guides secured to the bracket, a second bracket, a block within the inner rim attached to the second bracket and forming a connection between the last named bracket and the inner rim, the legs of the last named bracket being slidable in the guide and a supporting web connecting the lower end of the legs for attachment to the spring of the vehicle in which the device is used.

2. The combination with a motor vehicle having an axle, a chassis, a bowed spring having the central portion thereof connected to the chassis, perches adjacent opposite ends of the axle, links pivoted to the perches and means connecting the ends of the bowed springs to the links, of a sleeve adapted to surround the axle adjacent each end, a pair of arms extending divergently upward from each sleeve, a transversely arcuate rim secured to the upper ends of the divergent arms, a similar transversely arcuate rim of less diameter than the first mentioned rim adapted to fit within the first mentioned rim, the said rims when assembled forming a substantially circular chamber, a cushioning element positioned in said chamber, a block within the second mentioned rim, a pair of divergent arms attached to the block and extending downwardly from the rims, a cross bar connecting the lower ends of the arms and forming a support for the vehicle spring near each end, heads formed on opposite ends of the transversely extending bar, brackets attached to the divergent arms on the sleeves and flanges on the brackets forming guides for the heads of the bar to prevent the device from coming out of proper position.

In testimony whereof I affix my signature in presence of two witnesses.

GUSTAV A. EBERHARDT.

Witnesses:
OTTO A. LIETZ,
ELMER J. KENKSICK.

Copies of this patent may be obtained for five cents each, by addressing the "Commissioner of Patents, Washington, D. C."